US012096184B2

(12) United States Patent
Guo et al.

(10) Patent No.: US 12,096,184 B2
(45) Date of Patent: Sep. 17, 2024

(54) HEARING AID COMPRISING A FEEDBACK CONTROL SYSTEM

(71) Applicant: Oticon A/S, Smørum (DK)

(72) Inventors: Meng Guo, Smørum (DK); Anders Meng, Smørum (DK); Bernhard Kuenzle, Düdingen (CH)

(73) Assignee: Oticon A/S, Smørum (DK)

( * ) Notice: Subject to any disclaimer, the term of this patent is extended or adjusted under 35 U.S.C. 154(b) by 0 days.

(21) Appl. No.: 17/673,089

(22) Filed: Feb. 16, 2022

(65) Prior Publication Data

US 2022/0264231 A1 Aug. 18, 2022

(30) Foreign Application Priority Data

Feb. 17, 2021 (EP) .................................... 21157638

(51) Int. Cl.
*H04R 25/00* (2006.01)

(52) U.S. Cl.
CPC ......... *H04R 25/453* (2013.01); *H04R 25/606* (2013.01)

(58) Field of Classification Search
CPC ...... H04R 2460/01; H04R 3/02; H04R 25/45; H04R 25/453; H04R 25/606; G10K 2210/3026
USPC ... 381/312, 317, 318, 71.1, 94.1, 93, 95, 96, 381/23.1, 56, 83
See application file for complete search history.

(56) References Cited

U.S. PATENT DOCUMENTS

| | | | | |
|---|---|---|---|---|
| 2017/0347207 | A1* | 11/2017 | De Haan | H04R 25/353 |
| 2017/0365245 | A1* | 12/2017 | Ku | G10K 11/17854 |
| 2018/0255394 | A1* | 9/2018 | Colich | H05B 45/14 |
| 2019/0132686 | A1* | 5/2019 | Kuriger | H04R 25/505 |
| 2020/0202833 | A1* | 6/2020 | Milani | G10K 11/17854 |

FOREIGN PATENT DOCUMENTS

| | | | |
|---|---|---|---|
| EP | 3 253 074 | A1 | 12/2017 |
| EP | 3 288 285 | A1 | 2/2018 |
| EP | 3 481 085 | A1 | 5/2019 |
| WO | WO 03/081947 | A1 | 10/2003 |

* cited by examiner

*Primary Examiner* — Norman Yu
(74) *Attorney, Agent, or Firm* — Birch, Stewart, Kolasch & Birch, LLP

(57) ABSTRACT

A hearing aid includes a forward path including a) an input transducer proving an electric input signal, b) a hearing aid processor, and c) an output transducer. The hearing aid further includes d) a feedback control system having d1) a feedback path estimator including an adaptive filter configured to provide an estimate of a current feedback path from the output transducer to at least one input transducer, the feedback path estimator being controllable via a feedback estimation control input, and d2) a combination unit in the forward path configured to subtract the estimate (v') of the current feedback path signal (v) from a signal of the forward path (y) to provide a feedback corrected signal (e), and e) a detector for providing the feedback estimation control input in dependence of an offset control signal indicative of an offset in the electric input signal or a signal originating therefrom.

20 Claims, 2 Drawing Sheets

HEARING AID COMPRISING A FEEDBACK CONTROL SYSTEM

TECHNICAL FIELD

The present disclosure deals with hearing aids, in particular with feedback control in hearing aids.

SUMMARY

Feedback control systems (e.g. feedback cancellation systems) using adaptive filters can be disturbed by sound onsets and/or transients. The offsets and transients can contribute a large gradient error for the adaptive filters, and thereby invoke a reduced feedback performance as the consequence.

A number of studies have been done to avoid this negative effect from onsets/transients.

However, to our knowledge, there are no existing publications/patents dealing with the sound offsets in connection with feedback cancellation.

In principle, the offset situation is the opposite of the onsets/transients, whereas the gradient to the adaptive filters consists of a very small error. This may be utilized for the estimation of filter coefficients of the adaptive filter of a feedback control system.

A Hearing Aid:

In an aspect of the present application, a hearing aid adapted to be worn by a user, or for being partially or fully implanted in the head of the user, is provided. The hearing aid comprises a forward path comprising

- at least one input transducer for converting a sound to corresponding at least one electric input signals representing said sound, the sound comprising target signal components and noise components,
- a hearing aid processor for providing a processed signal in dependence of said at least one electric input signal, and
- an output transducer for providing stimuli perceivable as sound to the user in dependence of said processed signal.

The hearing aid may further comprise

- a feedback control system comprising
  - a feedback path estimator comprising an adaptive filter configured to provide an estimate of a current feedback path from said output transducer to said at least one input transducer in dependence of said processed signal and said at least one electric input signal or a signal originating therefrom, the feedback path estimator being controllable via a feedback estimation control input, and
  - a combination unit in the forward path configured to subtract said estimate of the current feedback path from a signal of the forward path to provide a feedback corrected signal The hearing aid may further comprise

- a detector for providing the feedback estimation control input in dependence of an offset control signal indicative of an offset in the at least one electric input signal or a signal originating therefrom.

Thereby an improved hearing aid may be provided.

The detector may be configured to detect an offset in the at least one electric input signal or a signal originating therefrom.

The detector may be configured to detect an offset as well as an onset in the at least one electric input signal or a signal originating therefrom.

The detector may be configured to provide an offset control signal indicative of an offset as well as an onset control signal indicative of an onset in the at least one electric input signal or a signal originating therefrom.

The detector may be configured to the provide said feedback estimation control input in dependence of said offset control signal as well as said onset control signal. The feedback estimation control input may be different for a detected offset than for a detected onset. The feedback estimator may be configured to react differently to the detected offset than to a detected onset.

An onset or an offset may e.g. be detected by monitoring fast (positive or negative, respectively) level changes of the electric input signal or the feedback corrected input signal.

Specifically, an onset or an offset may e.g. be detected by monitoring fast (positive or negative, respectively) level changes of the electric input signal or the feedback corrected input signal, these fast level changes being due to level changes in the incoming signal, which is also called acoustic input from the environment, received by the input transducer.

A ‘fast onset’ may e.g. correspond to a transition between no speech and speech (onset of speech). A ‘fast offset’ may e.g. correspond to a transition between speech and no speech (‘offset’ of speech).

The hearing aid may be configured so that the adaptive filter update is controllable via the feedback estimation control input provided by the detector. The adaptation can for example be constrained to pre-defined values based on the feedback estimation control input.

The hearing aid may be configured so that an adaptation rate of the adaptive filter of the feedback path estimator is controllable via the feedback estimation control input provided by the detector. The adaptive filter comprises an adaptive algorithm. The adaptive algorithm may comprise a Least Mean Square (LMS) or a Normalized LMS (NLMS) algorithm. Both algorithms have the property of minimizing an error signal in a mean square sense. The NLMS algorithm additionally normalizing the filter update with respect to the squared Euclidean norm of a reference signal. For an LMS or NLMS algorithm the adaptation rate is controllable via a step size.

The hearing aid may comprise a filter bank allowing processing of the hearing aid to be performed in frequency sub-bands. The adaptation speed (or rate) may be controlled differently in different frequency sub-bands.

Basically, the different operators can be used in different parts of the adaptive algorithm.

The adaptation rate of the adaptive filter can e.g. be controlled in various ways, e.g. based on information about tonality, onsets, or offsets.

The feedback path estimator may be configured to modify a normalization term of the Normalized LMS (NLMS) algorithm over different frequency sub-bands via the feedback estimation control input.

The detector may be configured to provide the feedback estimation control input in dependence of a detected tonality of the electric input signal or a signal originating therefrom.

The detector may be configured to detect a tonality parameter (e.g. by a detecting specific narrow-band frequency content (‘a tone’) in a signal of the forward path of the hearing aid.

The adaptation rate may be decreased in case tonality above a threshold is detected. In case tonality is detected in a specific frequency sub-band, the adaptation speed may be decreased in one or more frequency sub-bands neighboring the specific frequency sub-band in question.

The adaptation rate may be controlled over several frequency sub-bands in dependence of a normalization over said frequency sub-bands. If an external tone is present in a sub-band, neighboring sub-band(s) may be normalized with similar energy as the sub-band where the tone is present. Thus, here a max-operator may be used over the normalization factors in the sub-bands in the adaptive algorithm.

The adaptation rate may be controlled over several frequency sub-bands using min, max, mean or median operators. Assuming that an onset is detected in a frequency region the step size applied in the frequency regions may be configured to a small value (or even zero). A min-operator may be used over neighboring sub-bands, e.g. to ensure that the adaptive filter doesn't drift. Alternatively, assuming an offset is detected in a sub-band, the adaptation rate may be increased in the neighboring sub-band using either max or mean operator to allow for some coupling between the sub-bands.

The hearing aid may comprise a level detector configured to detect level changes in the at least one electric input signal or a signal originating therefrom. The level detector may be configured to estimate the level on a time sample basis. The level detector may e.g. be configured to determine a positive or negative change in level, to thereby differentiate between an onset and an offset of the at least one electric input signal. The level detector may e.g. comprise a level detector as described in WO2003081947A1. The level detector may operate in frequency sub-bands (with individual level estimates in individual sub-bands).

The hearing aid may be adapted to provide a frequency dependent gain and/or a level dependent compression and/or a transposition (with or without frequency compression) of one or more frequency ranges to one or more other frequency ranges. e.g. to compensate for a hearing impairment of a user. The hearing aid may comprise a signal processor for enhancing the input signals and providing a processed output signal.

The hearing aid may comprise an output unit for providing a stimulus perceived by the user as an acoustic signal based on a processed electric signal. The output unit may comprise a number of electrodes of a cochlear implant (for a CI type hearing aid) or a vibrator of a bone conducting hearing aid. The output unit may comprise an output transducer. The output transducer may comprise a receiver (loudspeaker) for providing the stimulus as an acoustic signal to the user (e.g. in an acoustic (air conduction based) hearing aid). The output transducer may comprise a vibrator for providing the stimulus as mechanical vibration of a skull bone to the user (e.g. in a bone-attached or bone-anchored hearing aid).

The hearing aid may comprise an input unit for providing an electric input signal representing sound. The input unit may comprise an input transducer, e.g. a microphone, for converting an input sound to an electric input signal. The input unit may comprise a wireless receiver for receiving a wireless signal comprising or representing sound and for providing an electric input signal representing said sound. The wireless receiver may e.g. be configured to receive an electromagnetic signal in the radio frequency range (3 kHz to 300 GHz). The wireless receiver may e.g. be configured to receive an electromagnetic signal in a frequency range of light (e.g. infrared light 300 GHz to 430 THz, or visible light. e.g. 430 THz to 770 THz).

The hearing aid may comprise a directional microphone system adapted to spatially filter sounds from the environment, and thereby enhance a target acoustic source among a multitude of acoustic sources in the local environment of the user wearing the hearing aid. The directional system may be adapted to detect (such as adaptively detect) from which direction a particular part of the microphone signal originates. This can be achieved in various different ways as e.g. described in the prior art. In hearing aids, a microphone array beamformer is often used for spatially attenuating background noise sources. Many beamformer variants can be found in literature. The minimum variance distortionless response (MVDR) beamformer is widely used in microphone array signal processing. Ideally the MVDR beamformer keeps the signals from the target direction (also referred to as the look direction) unchanged, while attenuating sound signals from other directions maximally. The generalized sidelobe canceller (GSC) structure is an equivalent representation of the MVDR beamformer offering computational and numerical advantages over a direct implementation in its original form.

The hearing aid may comprise antenna and transceiver circuitry (e.g. a wireless receiver) for wirelessly receiving a direct electric input signal from another device, e.g. from an entertainment device (e.g. a TV-set), a communication device, a wireless microphone, or another hearing aid. The direct electric input signal may represent or comprise an audio signal and/or a control signal and/or an information signal. In general, a wireless link established by antenna and transceiver circuitry of the hearing aid can be of any type. The wireless link may be a link based on near-field communication, e.g. an inductive link based on an inductive coupling between antenna coils of transmitter and receiver parts. The wireless link may be based on far-field, electromagnetic radiation. Preferably, frequencies used to establish a communication link between the hearing aid and the other device is below 70 GHz. e.g. located in a range from 50 MHz to 70 GHz, e.g. above 300 MHz, e.g. in an ISM range above 300 MHz, e.g. in the 900 MHz range or in the 2.4 GHz range or in the 5.8 GHz range or in the 60 GHz range (ISM=Industrial, Scientific and Medical, such standardized ranges being e.g. defined by the International Telecommunication Union, ITU). The wireless link may be based on a standardized or proprietary technology. The wireless link may be based on Bluetooth technology (e.g. Bluetooth Low-Energy technology).

The hearing aid may be or form part of a portable (i.e. configured to be wearable) device. e.g. a device comprising a local energy source, e.g. a battery, e.g. a rechargeable battery. The hearing aid may e.g. be a low weight, easily wearable, device, e.g. having a total weight less than 100 g, such as less than 20 g.

An analogue electric signal representing an acoustic signal may be converted to a digital audio signal in an analogue-to-digital (AD) conversion process, where the analogue signal is sampled with a predefined sampling frequency or rate $f_s$, $f_s$ being e.g. in the range from 8 kHz to 48 kHz (adapted to the particular needs of the application) to provide digital samples $x_n$ (or x[n]) at discrete points in time $t_n$ (or n), each audio sample representing the value of the acoustic signal at $t_n$ by a predefined number $N_b$ of bits. $N_b$ being e.g. in the range from 1 to 48 bits, e.g. 24 bits. Each audio sample is hence quantized using $N_b$ bits (resulting in $2^{Nb}$ different possible values of the audio sample). A digital sample x has a length in time of $1/f_s$, e.g. 50 μs, for $f_s$=20 kHz. A number of audio samples may be arranged in a time frame. A time frame may comprise 64 or 128 audio data samples. Other frame lengths may be used depending on the practical application.

The hearing aid may comprise an analogue-to-digital (AD) converter to digitize an analogue input (e.g. from an input transducer, such as a microphone) with a predefined sampling rate, e.g. 20 kHz. The hearing aids may comprise a digital-to-analogue (DA) converter to convert a digital signal to an analogue output signal, e.g. for being presented to a user via an output transducer.

The hearing aid, e.g. the input unit, and or the antenna and transceiver circuitry may comprise a TF-conversion unit for providing a time-frequency representation of an input signal. The time-frequency representation may comprise an array or map of corresponding complex or real values of the signal in question in a particular time and frequency range. The TF conversion unit may comprise a filter bank for filtering a (time varying) input signal and providing a number of (time varying) output signals each comprising a distinct frequency range of the input signal. The TF conversion unit may comprise a Fourier transformation unit for converting a time variant input signal to a (time variant) signal in the (time-) frequency domain. The frequency range considered by the hearing aid from a minimum frequency $f_{min}$ to a maximum frequency $f_{max}$ may comprise a part of the typical human audible frequency range from 20 Hz to 20 kHz, e.g. a part of the range from 20 Hz to 12 kHz. Typically, a sample rate $f_s$ is larger than or equal to twice the maximum frequency $f_{max}$, $f_s \geq 2f_{max}$. A signal of the forward and/or analysis path of the hearing aid may be split into a number NI of frequency bands (e.g. of uniform width), where NI is e.g. larger than 5, such as larger than 10, such as larger than 50, such as larger than 100, such as larger than 500, at least some of which are processed individually. The hearing aid may be adapted to process a signal of the forward and/or analysis path in a number NP of different frequency channels (NP≤NI). The frequency channels may be uniform or non-uniform in width (e.g. increasing in width with frequency), overlapping or non-overlapping.

The hearing aid may be configured to operate in different modes. e.g. a normal mode and one or more specific modes, e.g. selectable by a user, or automatically selectable. A mode of operation may be optimized to a specific acoustic situation or environment. A mode of operation may include a low-power mode, where functionality of the hearing aid is reduced (e.g. to save power), e.g. to disable wireless communication, and/or to disable specific features of the hearing aid.

The hearing aid may comprise a number of detectors configured to provide status signals relating to a current physical environment of the hearing aid (e.g. the current acoustic environment), and/or to a current state of the user wearing the hearing aid, and/or to a current state or mode of operation of the hearing aid. Alternatively or additionally, one or more detectors may form part of an external device in communication (e.g. wirelessly) with the hearing aid. An external device may e.g. comprise another hearing aid, a remote control, and audio delivery device, a telephone (e.g. a smartphone), an external sensor, etc.

One or more of the number of detectors may operate on the full band signal (time domain). One or more of the number of detectors may operate on band split signals ((time-) frequency domain). e.g. in a limited number of frequency bands.

The number of detectors may comprise a level detector for estimating a current level of a signal of the forward path. The detector may be configured to decide whether the current level of a signal of the forward path is above or below a given (L-)threshold value. The level detector operates on the full band signal (time domain). The level detector operates on band split signals ((time-) frequency domain).

The hearing aid may comprise a voice activity detector (VAD) for estimating whether or not (or with what probability) an input signal comprises a voice signal (at a given point in time). A voice signal may in the present context be taken to include a speech signal from a human being. It may also include other forms of utterances generated by the human speech system (e.g. singing). The voice activity detector unit may be adapted to classify a current acoustic environment of the user as a VOICE or NO-VOICE environment. This has the advantage that time segments of the electric microphone signal comprising human utterances (e.g. speech) in the user's environment can be identified, and thus separated from time segments only (or mainly) comprising other sound sources (e.g. artificially generated noise). The voice activity detector may be adapted to detect as a VOICE also the user's own voice. Alternatively, the voice activity detector may be adapted to exclude a user's own voice from the detection of a VOICE.

The hearing aid may comprise an own voice detector for estimating whether or not (or with what probability) a given input sound (e.g. a voice, e.g. speech) originates from the voice of the user of the system. A microphone system of the hearing aid may be adapted to be able to differentiate between a user's own voice and another person's voice and possibly from NON-voice sounds.

The number of detectors may comprise a movement detector, e.g. an acceleration sensor. The movement detector may be configured to detect movement of the user's facial muscles and/or bones, e.g. due to speech or chewing (e.g. jaw movement) and to provide a detector signal indicative thereof.

The hearing aid may comprise a classification unit configured to classify the current situation based on input signals from (at least some of) the detectors, and possibly other inputs as well. In the present context 'a current situation' may be taken to be defined by one or more of a) the physical environment (e.g. including the current electromagnetic environment. e.g. the occurrence of electromagnetic signals (e.g. comprising audio and/or control signals) intended or not intended for reception by the hearing aid, or other properties of the current environment than acoustic);
b) the current acoustic situation (input level, feedback, etc.), and
c) the current mode or state of the user (movement, temperature, cognitive load, etc.);
d) the current mode or state of the hearing aid (program selected, time elapsed since last user interaction, etc.) and/or of another device in communication with the hearing aid.

The classification unit may be based on or comprise a neural network, e.g. a rained neural network.

The hearing aid may comprise an acoustic (and/or mechanical) feedback control (e.g. suppression) or echo-cancelling system. Adaptive feedback cancellation has the ability to track feedback path changes over time. It is typically based on a linear time invariant filter to estimate the feedback path but its filter weights are updated over time. The filter update may be calculated using stochastic gradient algorithms, including some form of the Least Mean Square (LMS) or the Normalized LMS (NLMS) algorithms. They both have the property to minimize the error signal in the mean square sense with the NLMS additionally normalizing the filter update with respect to the squared Euclidean norm of some reference signal.

The hearing aid may further comprise other relevant functionality for the application in question, e.g. compression, noise reduction, etc.

The hearing aid may comprise a hearing instrument, e.g. a hearing instrument adapted for being located at the ear or fully or partially in the ear canal of a user, e.g. a headset, an earphone, an ear protection device or a combination thereof. The hearing assistance system may comprise a speakerphone (comprising a number of input transducers and a number of output transducers, e.g. for use in an audio conference situation), e.g. comprising a beamformer filtering unit, e.g. providing multiple beamforming capabilities.

Use:

In an aspect, use of a hearing aid as described above, in the 'detailed description of embodiments' and in the claims, is moreover provided. Use may be provided in a system comprising one or more hearing aids (e.g. hearing instruments), headsets, ear phones, active ear protection systems, etc., e.g. in handsfree telephone systems, teleconferencing systems (e.g. including a speakerphone), public address systems, karaoke systems, classroom amplification systems, etc.

A Method:

In an aspect, a method of operating a hearing aid adapted to be worn by a user, or for being partially or fully implanted in the head of the user, is furthermore provided by the present application. The hearing aid may comprise a forward path comprising

- at least one input transducer for converting a sound to corresponding at least one electric input signals representing said sound, the sound comprising target signal components and noise components,
- a hearing aid processor for providing a processed signal in dependence of said at least one electric input signal, and
- an output transducer for providing stimuli perceivable as sound to the user in dependence of said processed signal.

The method may comprise

- adaptively providing an estimate of a current feedback path from said output transducer to said at least one input transducer in dependence of said processed signal and said at least one electric input signal or a signal originating therefrom,
- controlling the estimate of a current feedback path via a feedback estimation control input, and
- subtracting said estimate of the current feedback path from a signal of the forward path to provide a feedback corrected signal, and
- providing said feedback estimation control input in dependence of an offset control signal indicative of an offset in the at least one electric input signal or a signal originating therefrom.

It is intended that some or all of the structural features of the device described above, in the 'detailed description of embodiments' or in the claims can be combined with embodiments of the method, when appropriately substituted by a corresponding process and vice versa. Embodiments of the method have the same advantages as the corresponding devices.

The method may e.g. comprise: providing that a rate of adaptively providing the estimate of the current feedback path is controllable via the feedback estimation control input.

A Computer Readable Medium or Data Carrier:

In an aspect, a tangible computer-readable medium (a data carrier) storing a computer program comprising program code means (instructions) for causing a data processing system (a computer) to perform (carry out) at least some (such as a majority or all) of the (steps of the) method described above, in the 'detailed description of embodiments' and in the claims, when said computer program is executed on the data processing system is furthermore provided by the present application.

By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Other storage media include storage in DNA (e.g. in synthesized DNA strands). Combinations of the above should also be included within the scope of computer-readable media. In addition to being stored on a tangible medium, the computer program can also be transmitted via a transmission medium such as a wired or wireless link or a network. e.g. the Internet, and loaded into a data processing system for being executed at a location different from that of the tangible medium.

A Computer Program:

A computer program (product) comprising instructions which, when the program is executed by a computer, cause the computer to carry out (steps of) the method described above, in the 'detailed description of embodiments' and in the claims is furthermore provided by the present application.

A Data Processing System:

In an aspect, a data processing system comprising a processor and program code means for causing the processor to perform at least some (such as a majority or all) of the steps of the method described above, in the 'detailed description of embodiments' and in the claims is furthermore provided by the present application.

A Hearing System:

In a further aspect, a hearing system comprising a hearing aid as described above, in the 'detailed description of embodiments', and in the claims, AND an auxiliary device is moreover provided.

The hearing system may be adapted to establish a communication link between the hearing aid and the auxiliary device to provide that information (e.g. control and status signals, possibly audio signals) can be exchanged or forwarded from one to the other.

The auxiliary device may comprise a remote control, a smartphone, or other portable or wearable electronic device, such as a smartwatch or the like.

The auxiliary device may be constituted by or comprise a remote control for controlling functionality and operation of the hearing aid(s). The function of a remote control may be implemented in a smartphone, the smartphone possibly running an APP allowing to control the functionality of the audio processing device via the smartphone (the hearing aid(s) comprising an appropriate wireless interface to the smartphone, e.g. based on Bluetooth or some other standardized or proprietary scheme).

The auxiliary device may be constituted by or comprise an audio gateway device adapted for receiving a multitude of audio signals (e.g. from an entertainment device, e.g. a TV or a music player, a telephone apparatus. e.g. a mobile telephone or a computer, e.g. a PC) and adapted for selecting and/or combining an appropriate one of the received audio signals (or combination of signals) for transmission to the hearing aid.

The auxiliary device may be constituted by or comprise another hearing aid. The hearing system may comprise two hearing aids adapted to implement a binaural hearing system, e.g. a binaural hearing aid system.

An APP:

In a further aspect, a non-transitory application, termed an APP, is furthermore provided by the present disclosure. The APP comprises executable instructions configured to be executed on an auxiliary device to implement a user interface for a hearing aid or a hearing system described above in the 'detailed description of embodiments', and in the claims. The APP may be configured to run on cellular phone, e.g. a smartphone, or on another portable device allowing communication with said hearing aid or said hearing system.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

The figures are schematic and simplified for clarity, and they just show details which are essential to the understanding of the disclosure, while other details are left out. Throughout, the same reference signs are used for identical or corresponding parts.

Figure 1:
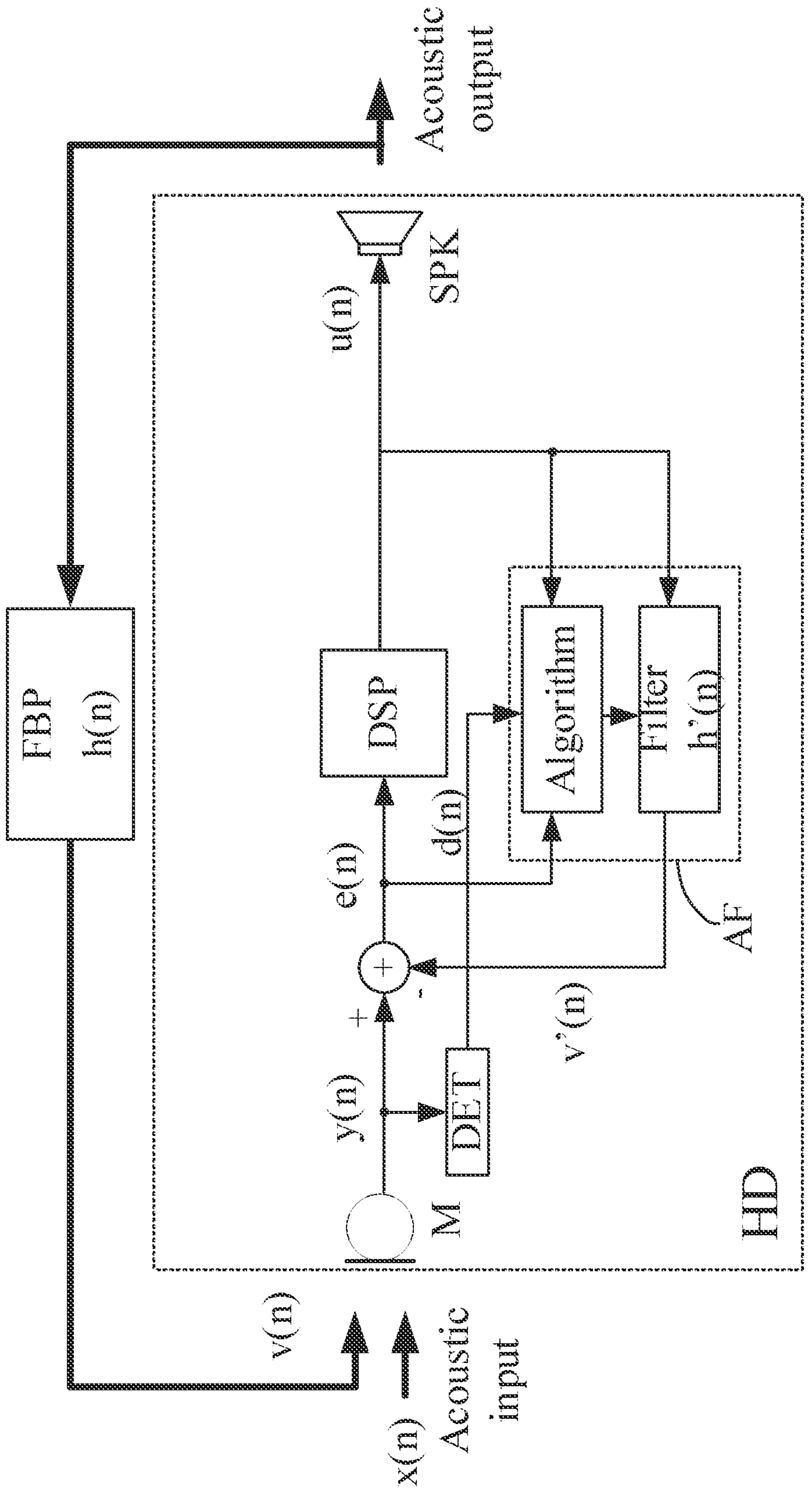
FIG. 1 shows a first embodiment of a hearing aid comprising a feedback control system according to the present disclosure.

Further scope of applicability of the present disclosure will become apparent from the detailed description given hereinafter. However, it should be understood that the detailed description and specific examples, while indicating preferred embodiments of the disclosure, are given by way of illustration only. Other embodiments may become apparent to those skilled in the art from the following detailed description.

DETAILED DESCRIPTION OF EMBODIMENTS

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include micro-electronic-mechanical systems (MEMS), integrated circuits (e.g. application specific), microprocessors, microcontrollers, digital signal processors (DSPs), field programmable gate arrays (FPGAs), programmable logic devices (PLDs), gated logic, discrete hardware circuits, printed circuit boards (PCB) (e.g. flexible PCBs), and other suitable hardware configured to perform the various functionality described throughout this disclosure, e.g. sensors, e.g. for sensing and/or registering physical properties of the environment, the device, the user, etc. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The present application relates to the field of hearing aids, in particular to feedback control in hearing aids. The present disclosure proposes a feedback canceller implemented using an adaptive filter and based on or utilizing sound offsets (e.g. in addition to sound onsets) to control the adaptation rate of the adaptive filter. The present disclosure proposes additional aspects of sound onsets, and other signal properties, such as tonality, to be related to adaptive filter adaptation speed, including normalization strategy and step size control.

Feedback cancellation systems using adaptive filters can be disturbed by sound onsets and/or transients. The onsets and transients can contribute a large gradient error to the adaptive filter adaptations, and thereby feedback performance can be degraded as the consequence.

In contrast, the sound offset situations are just the opposite of the onsets/transients, whereas the gradient to the adaptive filters consists of a very small error, and we can/should utilize this for the adaptive filter estimation.

In following, a strategy as to how the effective adaptation speed of the adaptive filter can be controlled, when considering signal onsets, offsets, and tonality.

FIG. 1 shows a first embodiment of a hearing aid comprising a feedback control system according to the present disclosure. FIG. 1 illustrates some basic components of a hearing aid: A) the forward path, B) an (unintentional, external) acoustic feedback path, and C) an electrical feedback cancellation path for reducing or cancelling acoustic feedback induced by the acoustic feedback path (FBP). The forward path comprises an input transducer (here a microphone (M)) for receiving an acoustic input from the environment ('Acoustic input' in FIG. 1) and providing an analogue or digital electric input signal y(n). The input transducer may comprise an analogue to digital converter (AD-converter) to provide the electric input signal as a stream of digital samples (y(n), n being a discrete time index. The forward path further comprises a digital signal processor (DSP) for adapting the signal to the needs of a wearer of the hearing aid (e.g. by providing a frequency and level dependent gain (amplification or attenuation) according to the user's needs, e.g. hearing impairment). The digital signal processor (DSP) provides a processed signal (u(n)) in dependence of the input signal (e(n) in FIG. 1) and a user's hearing profile. e.g. an audiogram). The forward path further comprises an output transducer (here a loudspeaker (SPK)) for generating an acoustic output ('Acoustic output' in FIG. 1) to the wearer of the hearing aid in dependence of the processed signal (u(n)). The output transducer may comprise a digital to analogue converter (DA-converter) for converting the processed (digital) signal u(n) to an analogue signal (as appropriate for the specific solution). An (external, unintentional) Acoustic Feedback path (FBP) from the output transducer to the input transducer is indicated. The electrical feedback cancellation path comprises an adaptive filter (Algorithm, Filter), whose filtering function (Filter) (e.g. defined by filter coefficients) is controlled by a prediction error algorithm (Algorithm), e.g. an LMS (Least Means Squared) algorithm, in order to predict and preferably cancel the part of the microphone signal (y(n)) that is caused by feedback from the loudspeaker (SPK) of the hearing aid (as indicated in FIG. 1 by bold arrow FBP). The adaptive filter (in FIG. 1 shown to comprise a 'Filter' part and a prediction error 'Algorithm' part) is aimed at providing a good estimate of the external feedback path from the electrical input of the output transducer (e.g. of a DA-converter) to the electrical output of the input transducer (e.g. of the AD-converter). The prediction error algorithm uses a reference signal (here the output signal u(n) from the digital signal processor DSP) together with the (feedback corrected) input signal e(n) from the microphone (the error signal) to find the setting (filter coefficients) of the adaptive filter that minimizes the prediction error when the reference signal is applied to the adaptive filter. The acoustic feedback is cancelled (or at least reduced) by subtracting (cf. SUM-unit '+' in FIG. 1) the estimate (v'(n)) of the acoustic feedback path provided by the output of the Filter part of the adaptive filter from the input signal (y(n)) from the microphone (M) comprising acoustic feedback (v(n) to provide the feedback corrected input signal (e(n)=y(n)−v'(n)). The dotted rectangle indicates that the enclosed blocks of the hearing aid (HD) are located in the same physical body (in the depicted embodiment). Alternatively, the microphone and processing unit and feedback cancellation system can be housed in one physical body and the output transducer in a second physical body, the first and second physical bodies being in communication with each other. Other divisions of the listening device in separate physical bodies can be envisaged.

The gradient for the adaptive filter estimation consists of two part, the correct gradient information to minimize the adaptive filter output, and the incorrect distortion due to the incoming signal x(n).

The gradient to each adaptive filter coefficient is computed as e(n)u(n)=(x(n)+v(n)−v'(n))u(n), and it is derived by minimizing the cost function $E[|e(n)|^2]$ with respect to the adaptive filter h'(n). Hence, e(n) u(n) is used as the gradient for the first adaptive filter coefficient, and e(n) u(n−1) as the gradient for the second coefficient, etc. Furthermore, the part (v(n)-v'(n))u(n) provides the correct gradient, whereas x(n) u(n) gives an error. Each signal e(n), u(n), etc., may be a frequency sub-band signal ($e_k(n)$, $u_k(n)$, etc., where subscript k denotes the $k^{th}$ frequency sub-band), e.g. in case of a frequency domain adaptive filter, etc.

In more detail, the gradient is derived as outlined in the following:

First, the cost function J(n) to be minimized is.

$$\begin{aligned} J(n) &= E\left[|e(n)|^2\right] \\ &= E\left[\left|y(n) - u^T(n) * h'(n)\right|^2\right] \\ &= E\left[y^2(n) - 2 * y(n) * u^T(n) * h'(n) + u^T(n) * h'(n) * u^T(n) * h'(n)\right) \end{aligned}$$

Then, take the partial derivative $$\begin{aligned} d\ J(n)/d\ h'(n) &= E\left[-2 * y(n) * u(n) + 2 * u^T(n) * h'(n) * u(n)\right] \\ &= E\left[-2 * \left(y(n) - u^T(n) * h'(n)\right) * u(n)\right] \\ &= -2 * E[e(n) * u(n)] \end{aligned}$$

Where E[.] denotes the expectation operator, and * represents the mathematical multiplication operator, and for the adaptive estimation, an estimate of the negative gradient e(n)*u(n) is used for the adaptation, where u(n)=[u(n), u(n−1), . . . , u(n−L+1)], and L is the length of the adaptive filter. For convenience, we refer to e(n)*u(n) as the gradient used for the adaptive filter estimation. The elements of the adaptive filter vector h'(n) are also referred to as the 'filter coefficients' at the given time index n. Each adaptive filter coefficient, may be identified by a 'coefficient index', 1=0, 1 . . . L−1, whereby the adaptive filter vector h'(n) can be expressed as:

$$h'(n)=[h_0'(n),h_1'(n), \ldots h_{L-1}'(n)]$$

In the extreme case of onsets/transients, x(n) is dominant compared to v(n)-v'(n), and hence the gradient e(n)u(n) is dominated by the undesired part of x(n)u(n), and ideally we should not use this undesired gradient in the feedback path estimation. This can e.g. be achieved by (at least) reducing the adaptation speed of the adaptive filter.

However, in the case of offsets, where x(n)≈0, and the gradient is dominated by (v(n)-v'(n))u(n), and we should make use of it, by e.g. increasing the adaptation speed of the adaptive filter.

The effect of the onset/offset on the adaptive filter based on an example LMS algorithm is:

$$h'(n)=h'(n-1)+\mu*e(n)*u(n),$$

$$h'(n)=h'(n-1)+\mu*(x(n)+v(n)-v'(n))*u(n)$$

$$h'(n)=h'(n-1)+\mu*(x(n)+u^T(n)*(h(n)-h'(n)))*u(n),$$

where '*' represents a mathematical multiplication operator, either for scalar values, or for vectors and matrices.

For onsets, where $x^2(n)>>u^2(n)$, or |x(n)|>>|u(n)| (i.e. where the magnitude of the x(n) term is greater than the magnitude of the u(n) term), $$h'(n)\sim=h'(n-1)+\mu*x(n)*u(n),$$

and an incorrect gradient of x(n)*u(n) is used, (where * represents the mathematical multiplication operator).

However, for offsets, where $u^2(n)>>x^2(n)$, or |u(n)|>>|x(n)| (i.e. where the magnitude of the u(n) term is greater than the magnitude of the x(n) term), $$h'(n)\sim=h'(n-1)+\mu*u^T(n)*(h(n)-h'(n))*u(n).$$

and a correct gradient of $u^T(n)*(h(n)-h'(n))*u(n)=(v(n)-v'(n))*u(n)$ is used. In practice, this can be done by detecting onsets/offsets and then control the adaptation speed (e.g. via a step size μ). An onset/offset detection (cf. detector. DET in FIG. 1) can be simply realized by comparing frame-based signal energy over a number of different time/frequency indices of the signal y(n) or e(n), cf. FIG. 1. An appropriate delay between the frames under consideration can e.g. be related to the feedback path delay. The output of the (onset/offset) detector (DET) is then used to control the adaptation speed (e.g. step size) in the adaptive algorithm (cf. signal d(n) from the detector (DET) to the algorithm part (Algorithm) of the adaptive filter. Onset or transient detection is e.g. discussed in EP3252074A1.

The onset/offset can e.g. be determined by first computing the ratio r(n) as $$r(n)=E[y^2(n)]/E[y^2(n-D)].$$

where D is a delay, e.g. the loop delay, or a delay corresponding to the forward path (also called forward path delay), or, preferably, a delay corresponding to the feedback path (also called feedback path delay).

The value of the feedback path delay can for example be between 0.2 millisecond and 0.5 millisecond. The value of the feedback path delay is less than the value of the loop delay, as the loop delay is the sum of the feedback path delay and the forward path delay, and as the value of the forward path delay is typically between 5 milliseconds and 10 milliseconds.

Then, an onset is detected if r(n)>threshold1, and an offset is detected if r(n)<threshold2, where threshold1 is a positive number bigger than 1 such as 2, 4, 8 . . . , threshold2 is a positive number smaller than 1, such as 0.5, 0.25, 0.125 . . . .

In practice, $E[y^2(n)]$ and $E[y^2(n-D)]$ are calculated by averaging $y^2(n)$ and $y^2(n-D)$ over time. This can also be done in (e.g. P) concatenated data frames (e.g. [Frame ('now'−P+1), . . . , Frame ('now'−1), Frame ('now')]).

Furthermore, the signal property of x(n) may also be used to control the adaptation speed. If the x(n) has a tonal behavior (e.g., flute music or many alarm signals), it is also desirable to decrease the adaptation speed of the adaptive filter, to slow down or even stop the adaptation in such a case to avoid a biased adaptive filter estimation. In practice, the signal x(n) is not available for processing, however, the signal y(n) or e(n) can then be used as an approximation for analyzing the property of x(n). The detector (DET) may thus be configured to detect a tonality parameter (e.g. a tone detector detecting specific narrow-band frequency content in a signal of the forward path of the hearing aid, e.g. (as here) in electric input signal (y(n) in FIG. 1), or in a feedback corrected input signal (e(n) in FIG. 1).

The hearing aid (HD) comprises a 'forward' (or 'signal') path for processing an audio signal between the input transducer (microphone M in FIG. 1) and the output transducer (loudspeaker SPK in FIG. 1). The hearing aid (HD) comprises an 'analysis' path comprising functional components for analyzing signals and/or controlling processing of the forward path (in FIG. 1, e.g., a) the detector (DET) determining characteristics of a signal of the forward path and controlling an adaptive filter (AF, via signal d(n)), and b) the adaptive filter (AF) for estimating acoustic feedback and providing a modification signal (v'(n)) to the forward path, etc.). Some or all signal processing of the analysis path and/or the forward path may be conducted in the frequency domain, in which case the hearing aid comprises appropriate analysis and synthesis filter banks. Some or all signal processing of the analysis path and/or the forward path may be conducted in the time domain.

The adaptation speed control may be carried out differently over frequencies, as the signal onset, offset, and tonality can be frequency limited. Moreover, it is also desirable that the adaptation speed control to handle onset, offset, and tonality have a wide (r) coverage over frequencies to ensure effectiveness and robustness, this is typically done by making the adaptation speed control to include neighbor frequency bands or a wide frequency region. For instance, one can divided the whole frequency range of the signal into different frequency regions (either uniform or non-uniform), and if an adaptation speed control is determined to be beneficial in one frequency region, it then always includes the neighbor frequency regions. In an example Normalized Least Mean Square (NLMS) algorithm, the adaptation speed control can be done by changing the step size, or by modifying the normalization term over different frequencies.

An example of changing the step size and/or normalization of the NLMS algorithm is provided below. The NLMS adaptation is expressed by $$h'(n)=h'(n-1)+\mu(n)*u(n)*e(n)/(s1(n)*\|u(n)\|^2+s2(n)),$$

The step size μ(n), and the scaling factors s1(n) and s2(n) are time varying.

In case of onsets/onsets, it would be appropriate to reduce/increase the step size μ(n), and/or to increase/reduce the scaling factors s1(n) and s2(n). The scaling factor s1(n) may e.g. take on values (e.g. in steps): . . . , $2^{-3}$, $2^{-2}$ . . . , $2^2$, $2^3$, . . . . The scaling factor s2(n) may e.g. take on values (e.g. in steps): . . . , $10^{-2}$, $10^{-1}$, $10^0$, $10^1$, $10^2$, . . . .

Furthermore, operations such as min, max, mean or median can be used to better control the adaptation over frequencies (to include a wider frequency region).

In an example case, taking the max value of the normalization terms over neighboring frequencies and apply it to all these neighboring frequencies can be beneficial if there is a high tonality in the signal x(n). The effect is a lowered adaptation speed in a bigger frequency region, to avoid the biased estimation problem in the adaptive filter.

In another example case, taking the min (or max) value of step size values over neighboring frequencies and apply it to all these neighboring frequencies can be beneficial if there is an onset (or offset) in the signal x(n).

Figure 2:
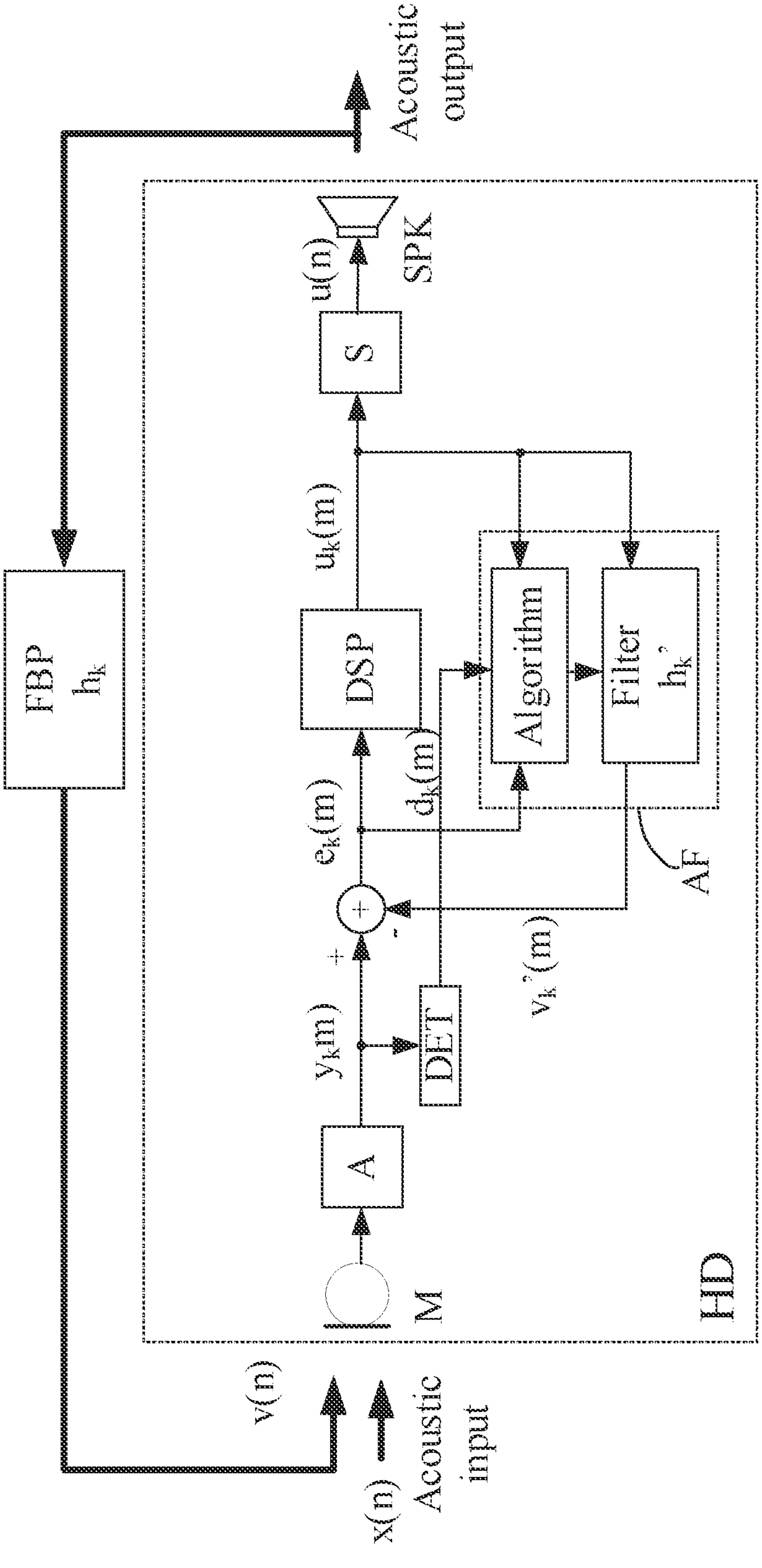
FIG. 2 shows a second embodiment of a hearing aid comprising a feedback control system according to the present disclosure.

FIG. 2 shows a second embodiment of a hearing aid comprising a feedback control system according to the present disclosure. The embodiment of FIG. 2 is similar to the embodiment of FIG. 1, apart from the specifically included analysis (A) and synthesis (S) filter banks included in the forward path of the hearing aid (HD) of FIG. 2. The location of the filter bank in the forward path of FIG. 2 indicates that all processing may be performed in the frequency domain (as indicated by signal names having a frequency index k as subscript and a time frame index m, e.g. $y_k(m)$, instead of time index n in FIG. 1. The analysis and synthesis filter banks may, however, be located elsewhere in the circuitry of the hearing device, e.g. allowing the subtraction of the feedback path estimate v'(n) from the electric input signal y(n) to be performed in the time domain. Considerations regarding minimizing processing delays due to the filter bank may decide where the domain transform is located (if at all used). The detection of onsets/offsets in the electric input signal may e.g. be based on the time domain electric input signal y(n) (cf. e.g. EP3252074A1). Other considerations may decide or influence the location of the filter bank(s).

It is intended that the structural features of the devices described above, either in the detailed description and/or in the claims, may be combined with steps of the method, when appropriately substituted by a corresponding process.

Embodiments of the disclosure may e.g. be useful in applications such as hearing aids or other devices or systems where feedback estimation is relevant.

As used, the singular forms "a." "an." and "the" are intended to include the plural forms as well (i.e. to have the meaning "at least one"), unless expressly stated otherwise. It will be further understood that the terms "includes," "comprises," "including." and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element but an intervening element may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method are not limited to the exact order stated herein, unless expressly stated otherwise.

It should be appreciated that reference throughout this specification to "one embodiment" or "an embodiment" or"an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects.

The claims are not intended to be limited to the aspects shown herein but are to be accorded the full scope consistent with the language of the claims, wherein reference to an element in the singular is not intended to mean "one and only one" unless specifically so stated, but rather "one or more." Unless specifically stated otherwise, the term "some" refers to one or more.

REFERENCES

EP3252074A1 (Oticon) Jun. 12, 2017
WO2003081947A1 (Oticon) Feb. 10, 2003

The invention claimed is:

1. A hearing aid adapted to be worn by a user comprising a forward path comprising at least one input transducer for converting a sound to corresponding at least one electric input signals representing said sound, the sound comprising target signal components and noise components, a hearing aid processor for providing a processed signal (u) in dependence of said at least one electric input signal, and an output transducer for providing stimuli perceivable as sound to the user in dependence of said processed signal, the hearing aid further comprising:

a feedback control system comprising:

a feedback path estimator comprising an adaptive filter configured to provide an estimate of a current feedback path from said output transducer to said at least one input transducer in dependence of said processed signal (u) and said at least one electric input signal (y) or a signal (e) originating therefrom, the feedback path estimator being controllable via a feedback estimation control input, and a combination unit in the forward path configured to subtract said estimate (v') of the current feedback path signal (v) from a signal of the forward path (y) to provide a feedback corrected signal (e), and a detector for providing said feedback estimation control input in dependence of a transient offset control signal indicative of a transient offset in the at least one electric input signal or a signal originating therefrom, wherein the detector is configured to detect the transient offset by comparing signal energy between two frames of said at least one electric input signal or signal originating therefrom, using a delay corresponding to the feedback path between said two frames.

2. A hearing aid according to claim 1 wherein an adaptation rate of the adaptive filter of the feedback path estimator is controllable via the feedback estimation control input provided by the detector.

3. A hearing aid according to claim 1 wherein the adaptive filter of the feedback path estimator comprises a Least Mean Square (LMS) or a Normalized LMS (NLMS) algorithm.

4. A hearing aid according to claim 1 comprising a filter bank allowing processing of the hearing aid to be performed in frequency sub-bands.

5. A hearing aid according to claim 3 wherein the feedback path estimator is configured to modify a normalization term of said Normalized LMS (NLMS) algorithm over different frequency sub-bands via said feedback estimation control input.

6. A hearing aid according to claim 1 wherein the detector is configured to provide said feedback estimation control input in dependence of a detected tonality of the electric input signal or a signal originating therefrom.

7. A hearing aid according to claim 6 wherein adaptation rate is decreased in case tonality above a threshold is detected.

8. A hearing aid according to claim 4 wherein the adaptation rate is controlled over several frequency sub-bands in dependence of a normalization over said frequency sub-bands.

9. A hearing aid according to claim 4 wherein the adaptation rate is controlled over several frequency sub-bands using min, max, mean or median operators.

10. A hearing aid according to claim 1 comprising a level detector configured to detect level changes in the at least one electric input signal or a signal originating therefrom.

11. A hearing aid according to claim 1 wherein the detector is configured to detect the transient offset as well as a transient onset in the at least one electric input signal or a signal originating therefrom.

12. A hearing aid according to claim 11 wherein the detector is configured to provide the transient offset control signal indicative of the transient offset as well as a transient onset control signal indicative of the transient onset in the at least one electric input signal or a signal originating therefrom.

13. A hearing aid according to claim 12 wherein the detector is configured to provide said feedback estimation control input in dependence of said transient offset control signal as well as said transient onset control signal.

14. A hearing aid according to claim 1 being constituted by or comprising an air-conduction type hearing aid, a bone-conduction type hearing aid, or a combination thereof.

15. A method of operating a hearing aid adapted to be worn by a user, the hearing aid comprising a forward path comprising:

at least one input transducer for converting a sound to corresponding at least one electric input signals representing said sound, the sound comprising target signal components and noise components, a hearing aid processor for providing a processed signal (U) in dependence of said at least one electric input signal, and an output transducer for providing stimuli perceivable as sound to the user in dependence of said processed signal, the method comprising:

adaptively providing an estimate of a current feedback path from said output transducer to said at least one input transducer in dependence of said processed signal (u) and said at least one electric input signal (y) or a signal (e) originating therefrom, controlling the estimate of a current feedback path via a feedback estimation control input, and subtracting said estimate (v) of the current feedback path signal (v) from a signal of the forward path (y) to provide a feedback corrected signal (e), providing said feedback estimation control input in dependence of a transient offset control signal indicative of a transient offset in the at least one electric input signal or a signal originating therefrom, wherein the transient offset is detected by comparing signal energy between two frames of said at least one electric input signal or signal originating therefrom, using a delay corresponding to the feedback path between said two frames.

16. A hearing aid according to claim 2 wherein the adaptive filter of the feedback path estimator comprises a Least Mean Square (LMS) or a Normalized LMS (NLMS) algorithm.

17. A hearing aid according to claim 2 comprising a filter bank allowing processing of the hearing aid to be performed in frequency sub-bands.

18. A hearing aid according to claim 3 comprising a filter bank allowing processing of the hearing aid to be performed in frequency sub-bands.

19. A hearing aid according to claim 4 wherein the feedback path estimator is configured to modify a normalization term of said Normalized LMS (NLMS) algorithm over different frequency sub-bands via said feedback estimation control input.

20. A hearing aid according to claim 2 wherein the detector is configured to provide said feedback estimation control input in dependence of a detected tonality of the electric input signal or a signal originating therefrom.

* * * * *